(12) United States Patent
Nguyen

(10) Patent No.: US 10,731,305 B2
(45) Date of Patent: Aug. 4, 2020

(54) FAST INSTALLING SELF-PROPELLED PONTOON BRIDGE

(71) Applicant: Dinh Chinh Nguyen, Thai Binh (VN)

(72) Inventor: Dinh Chinh Nguyen, Thai Binh (VN)

(73) Assignee: Dinh Chinh Nguyen, Thai Binh (VN)

( * ) Notice: Subject to any disclaimer, the term of this patent is extended or adjusted under 35 U.S.C. 154(b) by 0 days.

(21) Appl. No.: 16/159,714

(22) Filed: Oct. 15, 2018

(65) Prior Publication Data
US 2019/0127931 A1 May 2, 2019

(30) Foreign Application Priority Data
Nov. 1, 2017 (VN) .............................. 1-2017-04356

(51) Int. Cl.
*E01D 15/22* (2006.01)
*B60F 3/00* (2006.01)
*F02B 61/04* (2006.01)

(52) U.S. Cl.
CPC ............ *E01D 15/22* (2013.01); *B60F 3/0007* (2013.01); *B60F 3/0061* (2013.01); *F02B 61/04* (2013.01); *F02B 61/045* (2013.01)

(58) Field of Classification Search
CPC ..... E01D 15/22; E01D 15/127; E01D 15/005; E01D 15/124; E01D 21/06; E01D 18/00; B60F 3/0007; B60F 3/0061
See application file for complete search history.

(56) References Cited

U.S. PATENT DOCUMENTS

| | | | | |
|---|---|---|---|---|
| 2,321,677 A | * | 6/1943 | Higgins | E01D 15/22 14/2.4 |
| 2,355,473 A | * | 8/1944 | Savage | B60F 3/0061 14/2.4 |
| 3,152,569 A | * | 10/1964 | Gehlen | B60F 3/0061 114/258 |
| 3,628,490 A | * | 12/1971 | Gehlen | B60F 3/0061 14/2.6 |
| 3,656,198 A | * | 4/1972 | Haensgen | B60F 3/0061 14/2.6 |
| 3,661,114 A | * | 5/1972 | Wagner | B60F 3/0061 440/12.52 |
| 4,214,546 A | * | 7/1980 | Jochum | E01D 15/22 14/71.7 |
| 4,621,385 A | * | 11/1986 | Gillois | B60F 3/0061 14/2.4 |
| 8,382,539 B2 | * | 2/2013 | Richeux | E01D 15/22 14/2.6 |
| 2003/0143900 A1 | * | 7/2003 | Eberl | B60F 3/0061 440/12.5 |
| 2009/0038088 A1 | * | 2/2009 | Adler | E01D 15/14 14/2.6 |
| 2018/0229563 A1 | * | 8/2018 | Berent | B60F 3/0038 |

FOREIGN PATENT DOCUMENTS

| | | |
|---|---|---|
| CL | 2008000561 A1 | 7/2008 |
| FR | 1150825 A | 1/1958 |
| FR | 2950567 B1 | 10/2012 |
| NL | 6915885 A | 4/1970 |

* cited by examiner

*Primary Examiner* — Abigail A Risic

(57) ABSTRACT

A fast installing self-propelled pontoon bridge consisting of the entrance vehicle (A-1), a vehicle-float which is connected with the entrance vehicle and an exit vehicle, an exit vehicle, and an anchoring vehicle to keep the bridge in one place, being equipped with an anchor to keep the pontoon bridge to resist the water flow.

1 Claim, 5 Drawing Sheets

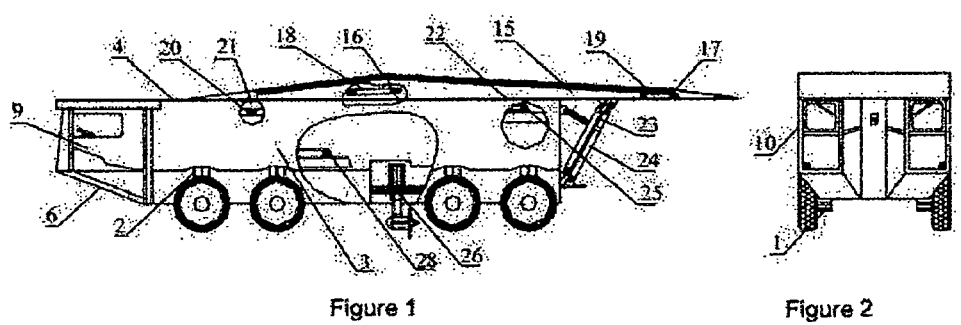
Figure 1
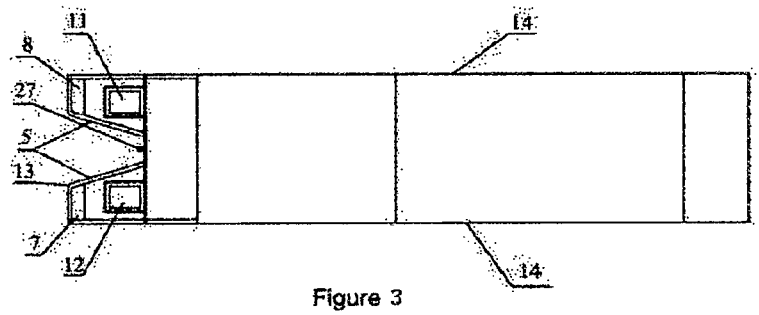
Figure 2
Figure 3

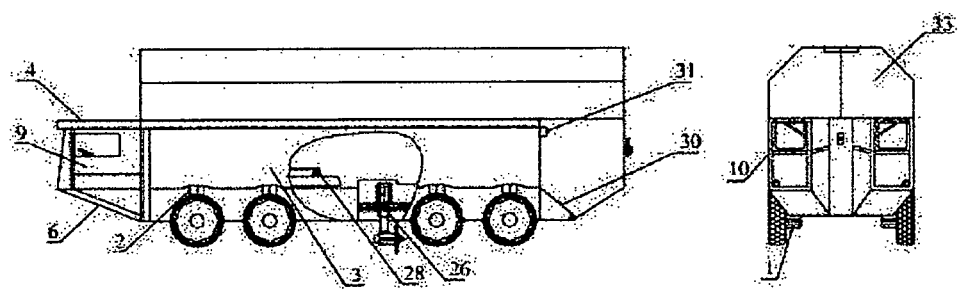
Figure 4
Figure 5
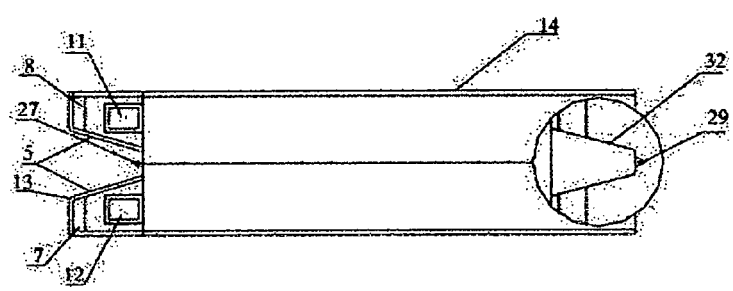
Figure 6

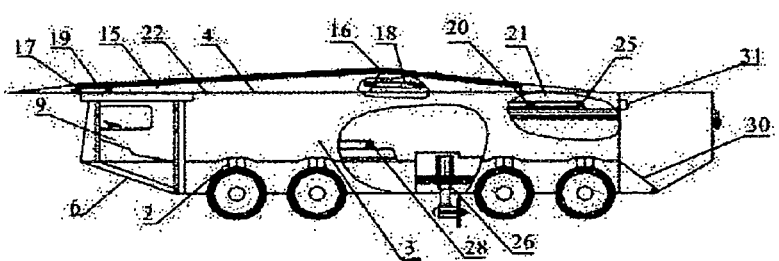
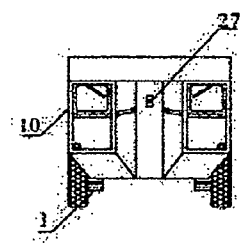
Figure 7
Figure 8
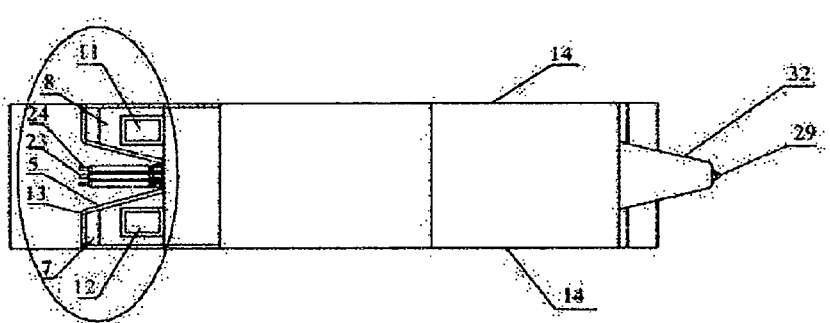
Figure 9

FAST INSTALLING SELF-PROPELLED PONTOON BRIDGE

FIELD OF THE INVENTION

This invention is about a fast installing self-propelled pontoon bridge.

BACKGROUND OF THE INVENTION

There have been various types of pontoon bridge (also known as floating bridge) which are utilized to cross rivers or canals. Such pontoon bridges use foldable hollow floats or boats connected together and combined with specialized trucks. When installing, the trucks carry the floats to the river bank, slide and release the floats into the water. The floats then self-unfold. A number of people and tugboats guiding the boats are required to assemble the bridge. Portions of the bridge are connected together using axle-pin; and the connection is made by the people.

Self-propelled pontoon bridge is the modern one which is equipped with engines, propellers, and cranes. Therefore, the tugboats are eliminated in this type of pontoon bridge. However, lots of man manipulations are still required to install the bridge due to the unsuitable lateral connections between portions. Also, craning the connecting bars is time consuming. These are the two disadvantages of the contemporary pontoon bridges.

SUMMARY OF THE INVENTION

The objective of the invention is to overcome the mentioned drawbacks of the contemporary pontoon bridges. The invention can help to reduce time and the number of man required to install and uninstall the bridge; it can also be used in difficult and small terrains.

In order to achieve the objectives, the pontoon bridge in the invention consists of:

The hollow floats are integrated with carrying vehicles; the ground-moving parts and the water-moving parts combined with the vehicles. The configuration and structure of the bridge are designed so as to reduce the time and number required to install and uninstall the bridge.

BRIEF DESCRIPTION OF DRAWINGS

The fast installing self-propelled pontoon bridge is illustrated by the following Figures:

FIG. A-1 presents the entrance vehicle of the pontoon bridge, consisting of:

FIG. 1 is the side view of the entrance vehicle of the pontoon bridge;

FIG. 2 depicts the front view the of entrance vehicle of the pontoon bridge;

FIG. 3 illustrates the top view of the entrance vehicle of the pontoon bridge.

FIG. A-2 presents vehicle-floats between exit vehicle and the entrance vehicle, consisting of:

FIG. 4 depicts the side view of vehicle-floats of the pontoon bridge

FIG. 5 presents the front view of vehicle-floats of the pontoon bridge;

FIG. 6 is the top view of vehicle-floats of the pontoon bridge.

Figure 10:
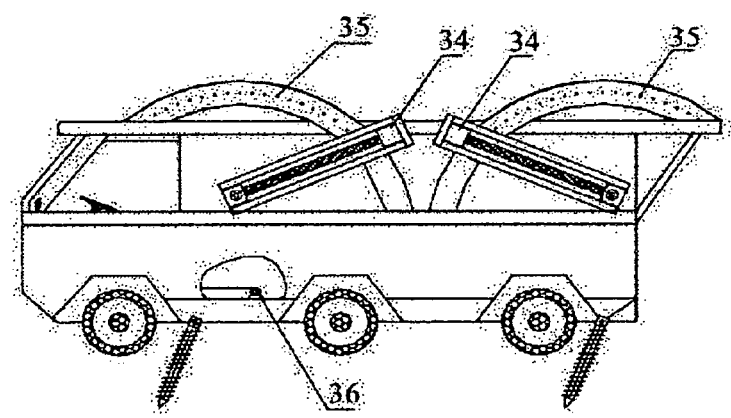
Figure 11:
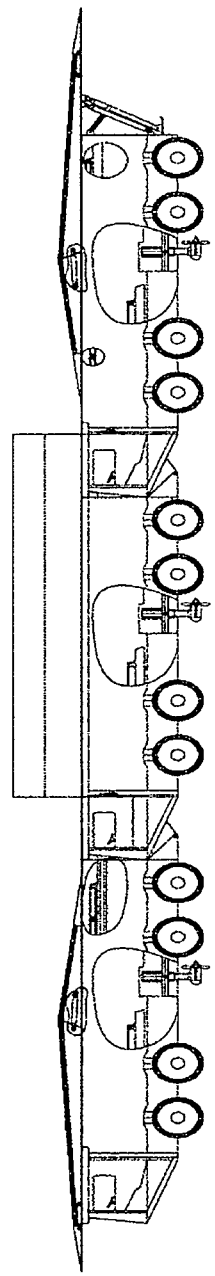

FIG. A-3 presents the exit vehicle of the pontoon bridge, consisting of:

FIG. 7 is the side view of the exit vehicle of the pontoon bridge;

FIG. 8 illustrates the front view of the exit vehicle of the pontoon bridge;

FIG. 9 is the top view of the exit vehicle of the pontoon bridge;

FIG. A-4 presents the anchoring vehicle mooring the bridge to the river bed. It consists of:

FIG. 10 depicts the side view of the anchoring vehicle.

FIG. A-5 presents fast installing self-propelled pontoon bridge.

FIG. A-1 is the entrance vehicle of the pontoon bridge, consisting FIG. 1, FIG. 2, and FIG. 3 as follows:

| |
|---|
| 1 - Hydraulic motor |
| 2 - Supporting axle, shock absorber |
| 3 - Vehicle body, main float |
| 4 - Vehicle floor |
| 5 - Cone joint (female-part) |
| 6 - Compensating chamfered portion |
| 7 - Main driving cab |
| 8 - Co-driving cab |
| 9 - Side door of main driving cab |
| 10 - Side door of co-driving cab |
| 11 - Top door of co-driving cab |
| 12 - Top door of main driving cab |
| 13 - Compensating contacting edge |
| 14 - Vehicle main wall |
| 15 - Beam |
| 16 - Beam joint |
| 17 - Heading part joint |
| 18 - Heading part lifting cylinder |
| 19 - Middle part lifting cylinder |
| 20 - Braking bridge wheel |
| 21 - Braking rail |
| 22 - Bridge supporting roller |
| 23 - Bridge supporting cylinder |
| 24 - Anti-sink cylinder |
| 25 - Bridge moving winch |
| 26 - Propellers |
| 27 - Connecting cable |
| 28 - Connecting cable winch |

FIG. A-2 depicts vehicle-floats between the exit vehicle and the entrance vehicle, consisting of FIGS. 4, 5, and 6:

| |
|---|
| 1 - Hydraulic motor |
| 2 - Supporting axle, shock absorber |
| 3 - Vehicle body, main float |
| 4 - Vehicle floor |
| 5 - Cone joint |
| 6 - Compensating chamfered portion |
| 7 - Main driving cab |
| 8 - Co-driving cab |
| 9 - Side door of main driving cab |
| 10 - Side door of co-driving cab |
| 11 - Top door of co-driving cab |
| 12 - Top door of main driving cab |
| 13 - Compensating contacting edge |
| 14 - Vehicle main wall |
| 26 - Propellers |
| 27 - Connecting cable |
| 28 - Connecting cable winch |
| 29 - Connecting axle-pin |
| 30 - Sliding platform |
| 31 - Abutment |

| | |
|---|---|
| 32 | - Cone joint |
| 33 | - Auxiliary float wing |

FIG. A-3 illustrates the exit vehicle of the pontoon bridge, consisting of FIGS. 7, 8, and 9 as follows:

| | |
|---|---|
| 1 | - Hydraulic motor |
| 2 | - Supporting axle, shock absorber |
| 3 | - Vehicle body, main float |
| 4 | - Vehicle floor |
| 5 | - Cone joint |
| 6 | - Compensating chamfered portion |
| 7 | - Main driving cab |
| 8 | - Co-driving cab |
| 9 | - Side door of main driving cab |
| 10 | - Side door of co-driving cab |
| 11 | - Top door of co-driving cab |
| 12 | - Top door of main driving cab |
| 13 | - Compensating contacting edge |
| 14 | - Vehicle main wall |
| 15 | - Beam |
| 16 | - Beam joint |
| 17 | - Heading part joint |
| 18 | - Heading part lifting cylinder |
| 19 | - Middle part lifting cylinder |
| 20 | - Wheel |
| 21 | - Braking rail |
| 22 | - Bridge supporting roller |
| 23 | - Bridge supporting cylinder |
| 24 | - Anti-sink cylinder |
| 25 | - Bridge moving winch |
| 26 | - Propellers |
| 27 | - Connecting cable |
| 28 | - Connecting cable winch |
| 29 | - Connecting axle-pin |
| 30 | - Sliding platform |
| 31 | - Abutment |
| 32 | - Cone joint |

FIG. A-4 presents the anchoring vehicle mooring the bridge to the river bed, including FIG. 10, as follows:
34—Hydraulic motor
35—Drilling angle positioning
36—Connecting cable winch

DETAILED DESCRIPTION OF THE INVENTION

Other than required technical characteristics as a normal vehicle, the fast installing self-propelled pontoon bridge has the features described as follows:

FIG. A-1 describes the entrance vehicle of the pontoon bridge which consists of FIGS. 1, 2, and 3. As illustrated in FIGS. 1, 2, and 3, the entrance vehicle coming in contact with the river bank has wheels directly driven by hydraulic motors (1), vehicle supporting axles, shock absorbers (2) with anti-water gaskets; the body (3) designed watertight is the main float for supporting load; The cab roof and the vehicle floor are made flat (4). The heading part designed as V-shape (5) is female part connecting with the male part of the cone joint on the vehicle-float; the lower part is chamfered (6) to reduce the resisting force of the water and to guide the vehicle when connecting. Cab is divided into two cabs for the driver (7) and co-driver (8). The two cabs have side doors (9)(10), and top doors (11)(12). The edges of the entrance vehicle contacting with the float are filleted (13), others are flat. The two vehicle main walls (14) are perpendicular to the floor. The bridge part of the entrance vehicle is designed with 3 supporting beams (15). It is divided into 3 askew parts. Two main parts are connected using axle-pins (16). The long askew part has auxiliary joint (17). The middle supporting beam is double one, between the joints (16)(17) are hydraulic cylinders (18)(19) to control the steep of the bridge according to that of river bank. The tailing part of the beam has wheels (20) to move the bridge. The rail (21) is next to the floor. The bridge supporting roller (22) is on the floor. The tailing part of the entrance vehicle is the part coming in contact with the river bank. Bridge supporting cylinders (23) are connected with the tailing part of the vehicle. Anti-sink cylinder (24) is to support the mass of the whole vehicle, to prevent the vehicle from sinking and being imbalanced. Winch (25) is to pull the bridge forwards and backwards. Propellers (26) integrated into the vehicle chassis, in the watertight chamber, is foldable within 180°. The connecting cable (27) is located at the bottom of the V-shape which is convenient for the drivers' assembling and disassembling manipulations. The connecting cable is coiled and uncoiled by winch (28). The drivers manipulate the "soft" connection between the entrance vehicle and the vehicle-floats when they are in the cab before going into the water. The time required to assemble the two vehicles is less than 15 seconds. After connecting, the winch (28) uncoils the cable to allow the vehicle-floats going into the water. Once the vehicles are in the water, the cable is coiled to pull the two vehicles towards each other. The vehicles become male-female parts of joint which are fast compensating and positioning due to special design. Hydraulic pins, which called "rigid" connections, are used to connect the two vehicles. Only one person per vehicle is required to assemble the vehicles due to the novelty design.

FIG. A-2 shows vehicle-floats after the exit vehicle, before the entrance vehicle, consisting of FIGS. 4, 5, and 6. As can be seen in the FIGS. 4,5, and 6, vehicle-floats are connected with the entrance vehicle and exit vehicle of the pontoon bridge. They have hydraulic motors (1) directly driving the wheels, rather than the differential axles in conventional systems. The hydraulic motor case (1) and axles (2) are connected with the body. The body (3) is designed watertight. The cab roof and the vehicle floor are made flat (4). The heading part designed as V-shape (5) is one part of the joint between two vehicles; the lower part is chamfered (6) to reduce the resisting force of the water and to guide the vehicle when connecting. Cab is divided into two cabs for the driver (7) and co-driver (8). The two cabs have side doors (9)(10), and top doors (11)(12). The edges of the entrance vehicle contacting with the float are filleted (13). The two vehicle main walls (14) are perpendicular to the floor. Propellers (26) integrated into the vehicle chassis, in the watertight chamber, is foldable within 180°. The connecting cable (27) is located at the bottom of the V-shape which is convenient for the drivers' assembling and disassembling manipulations when they are in the cabs. The connecting cable is coiled and uncoiled by winch (28) to connect with other vehicles. Connecting axle-pin (29) of the female part of the cone joint is towards the ending portion of the bridge. Sliding platform (30) at the tail of the vehicle is to guide other vehicles and to prevent the vehicle from vibrating. The abutment (31) is to support forces. The cone structure at the tailing part of the vehicle makes the male part of compensating joint (32). Auxiliary floatwing folded on the floor is controlled by hydraulic cylinders. When installing, the vehicles are connected with each other by cable (27) and axle-pin (29). The driver and co-driver manipulate the "soft" connections between the vehicles when they are in the cab before going into the water. The time required to assemble the two vehicles is less than 15 seconds. After connecting, the winch (28) uncoils the cable to allow the vehicle-floats going into the water. Once the vehicles are in the water, they move forwards using the propellers (26). The "soft" connection is to reduce resisting forces which reduce the vehicles speed in the water.

When the exit vehicle approaching the river bank, the vehicles coil the cable and are positioned by compensating male-female-joints between the vehicles. Hydraulic pins are controlled by the driver and co-driver to firmly connect the two vehicles. This is called the connecting the main floats stage; and it is followed by auxiliary floatwing being lowered to connect with the main walls of the vehicles. All the work is done with people being in the cabs. Only one person per vehicle is required to assemble the vehicles due to the novelty design.

FIG. A-3 shows the exit vehicle of the pontoon bridge, consisting of FIGS. 7, 8, and 9. As illustrated in FIGS. 7, 8, and 9, the exit vehicle has wheels directly driven by hydraulic motors (1), vehicle supporting axles, shock absorbers (2) with anti-water gaskets; the body (3) designed watertight is the main float for supporting load; The cab roof and the vehicle floor are made flat (4). The heading part is designed as V-shape (5); the lower part is chamfered (6) to reduce the resisting force of the water and to guide the vehicle when connecting. Cab is divided into two cabs for the driver (7) and co-driver (8). The two cabs have side doors (9)(10), and top doors (11)(12). The edges of the exit vehicle contacting with the floats are filleted. The tailing part of the vehicle is designed as cone shape to fit the V-shape of the vehicle-floats. The two vehicle main walls (14) are perpendicular to the floor. The bridge part of the exit vehicle is designed with 3 supporting beams (15). It is divided into 3 askew parts. Two main parts are connected using axle-pins (16). The long askew part has auxiliary joint (17). The middle supporting beam is double one, between the joints (16)(17) are hydraulic cylinders (18)(19) to control the steep of the bridge according to that of river bank. The tailing part of the beam has wheels (20) to move the bridge. The rail (21) is next to the floor. The bridge supporting roller (22) is on the floor. The heading part of the exit vehicle is the part coming in contact with the river bank. Bridge supporting cylinders (23) are connected with the heading part of the vehicle at the bottom of the V-shape. Anti-sink cylinder (24) is to support the mass of the whole vehicle, to prevent the vehicle from sinking and being imbalanced. Winch (25) is to pull the bridge forwards and backwards. Propellers (26) integrated into the vehicle chassis, in the watertight chamber, is foldable within 180°. When installing, the exit vehicle and vehicle-floats are connected by connecting axle-pin (29) with connecting cable (27) before entering the water; this is called "soft" connecting stage. The time required to attach the vehicle-floats to the exit vehicle is less than 15 seconds. Sliding platform (30) at the tail of the vehicle is to guide the vehicle-floats and to prevent the vehicle from vibrating. The abutment (31) is to support forces. The cone structure at the tailing part of the vehicle makes the male part of compensating joint (32). When the exit vehicle approaching the river bank, the vehicles coil the cable and are positioned by compensating male-female-joint between the heading part of the vehicle-floats and the tailing part of the exit vehicle. Hydraulic pins are controlled by the driver and co-driver to firmly connect the two vehicles. This is called "rigid" connecting stage. Only one person per vehicle is required to assemble the vehicles due to the novelty design.

FIG. A-4 is the description of the anchoring vehicle to keep the bridge in one place; detail is in FIG. 10. As shown in FIG. 10, the bridge is equipped with the anchor to keep the pontoon bridge to resist the water flow. The anchoring vehicle has high ability of overcoming terrain; drill is attached to the side wall of the vehicle. The drill operates using the hydraulic motor (34), drilling angle positioning system (35). The anchoring vehicle also have connecting cable winch (36). Installing and uninstalling the pontoon bridge is fast and stable due to the anchoring vehicle.

I claim:
1. A fast installing self-propelled pontoon bridge comprising:
   an entrance vehicle comprising:
      first wheels;
      a first body configured to be watertight;
      a first V-shaped heading part which connects with a vehicle-float, wherein the lower part of the heading part is chamfered to reduce the resisting force of the water and to guide the vehicle when connecting to the vehicle-float, and the heading part comprises two cabs for the driver and co-driver, the two cabs have side doors, and top doors;
      a bridge part of the entrance vehicle comprising three supporting beams, divided into three askew parts, wherein two parts are connected using axle-pins and an auxiliary joint, hydraulic cylinders provided between the joints, the tailing part of the beam having wheels to move the bridge, a rail next to the floor, a bridge supporting roller on the floor, the tailing part of the entrance vehicle coming into contact with the river bank, bridge supporting cylinders connected with the tailing part of the vehicle, an anti-sink cylinder supporting the mass of the whole vehicle, a winch which pull the bridge forwards and backwards, propellers integrated into the vehicle chassis and foldable within 180°;
      a first connecting cable located at the bottom of the heading part, the connecting cable is coiled and uncoiled by a winch;
   a vehicle-float which is connected with the entrance vehicle and an exit vehicle, comprising:
      second wheels;
      a second body configured to be watertight;
      a second V-shaped heading part which is one part of the joint between two vehicles; wherein the lower part of the heading part is chamfered to reduce the resisting force of the water and to guide the vehicle when connecting to the entrance vehicle, and the heading part comprises two cabs for the driver and co-driver, the two cabs have side doors, and top doors;
      propellers integrated into the vehicle chassis and foldable within;
      a second connecting cable located at the bottom of the heading part, the connecting cable is coiled and uncoiled by a winch;
   an exit vehicle comprising:
      third wheels;
      a third body configured to be watertight;
      a third V-shaped heading part, wherein the lower part of the heading part is chamfered to reduce the resisting force of the water and to guide the vehicle when connecting to the vehicle-float, the heading part comprising two cabs for the driver and co-driver, the two cabs have side doors, and top doors;
      a bridge part of the exit vehicle comprising three supporting beams, divided into three askew parts, wherein two parts are connected using axle-pins, and an auxiliary joint, hydraulic cylinders provided between the joints, the tailing part of the beam having wheels to move the bridge, a rail next to the floor, the bridge supporting roller on the floor, the heading part of the exit vehicle coming into contact with the river bank, bridge supporting cylinders connected with the heading part of the vehicle at the bottom of the V-shape heading part, an anti-sink cylinder supporting the mass of the whole vehicle, a winch which pulls the bridge forwards and backwards, propellers integrated into the vehicle chassis and foldable within 180°;

an anchoring vehicle to keep the bridge in one place, being equipped with an anchor to keep the pontoon bridge to resist the water flow, a drill attached to the side wall of the vehicle, the drill operates using hydraulic motors, drilling angle positioning system, the anchoring vehicle having a connecting cable winch.

\* \* \* \* \*